United States Patent [19]

Miller et al.

[11] 4,297,131

[45] Oct. 27, 1981

[54] PROCESSING OF TITANIFEROUS MATERIALS

[75] Inventors: John G. Miller, Philadelphia, Pa.; Thomas C. Schwab, Plainfield, N.J.

[73] Assignee: Engelhard Minerals & Chemicals Corporation, Edison, N.J.

[21] Appl. No.: 71,018

[22] Filed: Aug. 30, 1979

[51] Int. Cl.³ .................... C22B 1/08; C22B 3/00
[52] U.S. Cl. .................... 75/1 T; 75/101 R; 75/111; 106/288 B; 423/76; 423/111; 423/131; 423/327; 423/492
[58] Field of Search .......... 75/1 R, 1 T, 84, 111–113, 75/101 R; 423/76, 79, 69, 131, 132, 74, 492, 327, 111; 106/288 B

[56] References Cited

U.S. PATENT DOCUMENTS

| | | | |
|---|---|---|---|
| 1,858,272 | 5/1932 | Jenness | 423/135 |
| 1,917,233 | 7/1933 | Bacon et al. | 75/113 |
| 2,870,073 | 1/1959 | Sokel et al. | 423/492 |
| 3,445,183 | 5/1969 | Cairns | 423/79 |
| 4,082,833 | 4/1978 | Wyndham et al. | 423/76 |
| 4,179,489 | 12/1979 | Lumsden | 423/79 |

FOREIGN PATENT DOCUMENTS 1187508  9/1959  France .................... 75/113

OTHER PUBLICATIONS

Weast, R. C., *Handbook of Chemistry and Physics*, 51st edition, The Chemical Rubber Co., pp. B-83, 147, 149, QD65C4 (1970).
Thrush, P. W., *A Dictionary of Mining Mineral and Related Terms*, U.S. Dept. of Interior, p. 89 (1968).
*Kirk–Othmer Encyclopedia of Chemical Technology*, vol. 19, pp. 397–398 (1969).
*Gmelins Handbuch der Anorganischen Chemie Schwefel*, Teil B–Lieferung 3, No. 9, pp. 1791–1799 (1963).

*Primary Examiner*—Michael L. Lewis
*Attorney, Agent, or Firm*—Inez L. Moselle; Donald D. Joye

[57] ABSTRACT

An improved method of extracting titanium from titaniferous materials by reaction with thionyl chloride to form titanium tetrachloride which is separated from the reaction products by volatilization or by extraction.

16 Claims, No Drawings

PROCESSING OF TITANIFEROUS MATERIALS

BACKGROUND OF THE INVENTION

1. Field of the Invention

The invention relates generally to the art of extracting titanium from titaniferous materials. In particular, the invention relates to the use of thionyl chloride to convert the titanium contained in such materials to titanium tetrachloride and also to the removal of the titanium chloride from the reacted materials.

2. Prior Art

The extraction of titanium from titanium-rich ores and minerals is an important industrial process used to produce titanium metal and metal alloys, titanium tetrachloride, titanium dioxide for use as a pigment and opacifier, and other titanium compounds. The principal ores and minerals employed are rutile, ilmenite and leucoxene. Two proceses are used commercially: in one, known as the "sulfate" process, ilmenite is dissolved in sulfuric acid, ferrous sulfate is partially separated by crystallization and hydrous titanium dioxide is then precipitated by hydrolysis of the ferruginous titanium sulfate solution. In the other process, known as the "chloride" process, rutile or mixtures of rutile, ilmenite and leucoxene are mixed with coke and chlorinated to volatilize titanium tetrachloride which is purified by distillation and then oxidized at a high temperature to produce titanium dioxide and regenerate chlorine.

The principal disadvantage of the sulfate process is that it generates large volumes of ferrous sulfate and dilute sulfuric acid containing iron as waste materials which are difficult to dispose of and, for this reason, it is now generally preferred to use the chloride process which generates a much smaller amount of objectionable waste material. However, the chloride process requires that the chlorination be carried out at a temperature of about 900° C. at which chlorine and the chloride reaction products have a highly corrosive effect on the refractory structure of the chlorinator; also high energy input is required. Moreover, the chloride process requires a feed-stock which is principally composed of rutile of which commercially significant deposits exist in only a few limited areas of the world and the continually increasing demand for it to produce titanium products has frequently led to shortage of supply. Alternative sources of titaniferous feedstock suitable for the chloride process have therefore been sought: among these is the so-called "synthetic rutile" or "up-graded ilmenite" produced by an elaborate and expensive process in which iron is selectively extracted from the more abundant mineral ilmenite. Another substitute for natural rutile is the so-called "Sorel slag" obtained by electric furnace reduction of ilmenite to produce molten iron and a titaniferous slag (Sorel slag). This slag can be used for the extraction of titanium either by the sulfate or by the chloride process, but its availability is generally limited by economic factors relative to the production of iron by this electro-reduction process since it is usually much cheaper to produce iron by the customary blast-furnace process using cheap, abundantly available iron ores. There is, thus, a need for other, more widely available, sources of titaniferous feed-stock for the titanium industry.

Titanium is widely distributed throughout the world in association in various mineralogical forms with other, more abundantly occurring minerals or ores. For examples, kaolins commonly contain 1 to 2% $TiO_2$, and bauxites contain 1 to 6% $TiO_2$. Processes have been developed in which titanium is extracted as the tetrachloride from clays and bauxite, but these invariably involve chlorination at temperatures in the region of 900° C. at which the mineral itself is consumed in the reaction. Usually the primary objective has been to produce aluminum trichloride with titanium tetrachloride as a by-product. One such process is the "Toth Process" described in the following U.S. Pat. Nos. 3,615,359, 3,615,360, 3,677,742, 3,713,809 and 3,713,811.

For some commercial applications of minerals such as kaolins or other clays and bauxites, high levels of $TiO_2$ are disadvantageous and the removal of some or all of the titanium is a desirable objective. Hereto, however, no process has been developed whereby the titanium can be extracted in a form suitable for making titanium metal, titanium dioxide or other titanium products without the parent mineral itself being substantially consumed at the same time.

It has long been known that pure titanium dioxide can be converted to titanium tetrachloride by reaction with thionyl chloride at comparatively low temperatures. The reaction was first reported by G. Darzens and F. Bourion (Comptes rendus hebdomaires des seances de l'Académie des Sciences, Vol. 153, pages 1270–1272 (1911). A more accurate description of the reaction was given by H. Hecht, G. Jander and H. Schlapmann (Zeitschrift für Anorganischen Chemie, Vol. 254, pages 255–264 (1947). As described in the latter publication, titanium dioxide, mixed with an excess of thionyl chloride, was heated for several hours at 300° C. in a sealed tube and the excess $SOCl_2$ was separated by distillation from the $TiCl_4$ produced in the reaction. No record has been found of the reaction of thionyl chloride with titanium when this is a constituent of other materials. To the best of our knowledge the prior art is devoid of a teaching or even a suggestion for the use of thionyl chloride to extract or remove titanium on a selective basis from titaniferous ores or minerals.

Accordingly, an objective of our invention is to provide an improved process for extracting titanium from titaniferous minerals and ores. Another objective is to provide a process whereby titanium can be recovered as tetrachloride from titaniferous minerals and ores at a reaction temperature substantially lower than that employed in the chlorination process hereto employed. Another objective is to provide a process whereby titanium can be extracted, wholly or in part, from minerals or ores in which it is a minor constituent without destroying the parent mineral.

THE INVENTION

Briefly stated, the essence of the present invention resides in reacting thionyl chloride with a titaniferous material selected from the group consisting of minerals containing titanium, titaniferous concentrates or tailings arising from beneficiation of minerals containing titanium and titaniferous waste products or by-products of the processing of minerals containing titanium or mixtures thereof under such conditions that the titanium contained in the material is converted wholly or in part into titanium tetrachloride.

A preferred embodiment of the invention comprises a process in which the titaniferous material, as heretofore defined, is caused to react with thionyl chloride at a temperature in the range of about 200° C. to about 500° C., preferably in the range of about 300° C. to 500° C.

and the titanium tetrachloride is separated from the unreacted portion of the material by conventional means such as volatilization or extraction with a suitable solvent.

In a specially important aspect of this embodiment of the invention the process of the invention comprises the steps of heating the ore or mineral to a temperature within the range of about 200° C. to about 500° C. while contacting it with thionyl chloride in vapor form, condensing the gaseous reaction products containing the vapors of titanium tetrachloride and excess thionyl chloride and recovering titanium tetrachloride from the condensate by distillation. If desired, the vapor of thionyl chloride may be diluted with a gas such as nitrogen.

DESCRIPTION OF PREFERRED EMBODIMENTS

In applying the process of the invention to a mineral in which titanium is the principal constituent, such as rutile, ilmenite, leucoxene or perovskite, the objective is to chlorinate substantially all of the titanium contained at the lowest practicable temperature. A bed of the mineral is formed in a reactor and the mineral is heated to a temperature of 250° C. to 450° C. while a stream of thionyl chloride vapor, preferably mixed with nitrogen diluent, is passed into the reactor. The exit gases from the reactor pass into a cooled condenser where the $TiCl_4$ and excess $SOCl_2$ are condensed along with impurities such as ferric chloride. The condensate is fractionally distilled in the conventional manner to recover substantially pure $TiCl_4$.

The objective in applying the process to ores or minerals in which titanium is only a minor constituent may be to reduce the titanium content for the purpose of improving the quality of the ore or mineral, or it may be to recover the titanium content as tetrachloride while retaining the residual ore or mineral substantially in its pristine form. In either case, it is necessary to effect the reaction at a temperature sufficiently high to effect the titanium-$SOCl_2$ reaction but below that at which the useful properties of the ore or mineral would be destroyed or impaired.

An example of the application of the process to remove a minor titaniferous constituent without impairing the end-use properties of the residues is the removal of colored anatase (titanium dioxide) from kaolin clay (hydrated aluminum silicate) to improve the brightness of the clay and thereby enhance its value as a mineral pigment or filler. As mentioned above, it is known that the titaniferous impurity in kaolin clay can be removed by volatilization with chlorine or source of chlorine such as carbon tetrachloride. As described in U.S. Pat. No. 3,236,606, kaolin is "bleached" with chlorine or a chlorine-containing compound by calcining the clay at 600° to 1200° C. and contacting the calcined clay with hot chlorine-containing gas to volatize colored impurities as the chloride. This and related processes for bleaching kaolin by volatilization of metal impurities are energy intensive and hence costly, because of the high temperatures required. Furthermore, dehydroxylation of the kaolin takes place. Typically this temperature is about 350° C. but may vary somewhat for clays of different origin. Therefore temperatures in the range of about 200° to 350° C., preferably in the range of about 250° C. to 300° C., are used when it is desired to make use of purified kaolin clay as a mineral pigment or filler while avoiding or minimizing dehydroxylation. Temperatures above 350° C., up to about 600° C., can be employed to reduce the titanium content of kaolin or other clays when dehydroxylation of the clay is not harmful.

If the ore or mineral contains free moisture, it may be preferred to first dry the mineral before causing it to react with $SOCl_2$ in order to avoid unnecessary wastage of $SOCl_2$ by reaction with this water. Gibbsitic bauxite is one example of an ore which is advantageously dehydrated thermally before undergoing reaction with thionyl chloride to remove a titaniferous impurity. Gibbsite contains three molecules of water for each molecule of alumina. Consumption of thionyl chloride will be reduced significantly by removing all or a major portion of the water from gibbsite by calcination in air before causing $SOCl_2$ to react with the associated titaniferous impurity. Similarly, if the ore or mineral contains water which is part of the constitution of the ore or mineral (chemically held water), it is generally preferable to remove the water of constitution by thermal means before reaction with $SOCl_2$ unless such dehydration destroys the usefulness of the ore or mineral as in the case of kaolin clay. Such may be the case with bauxite which, if in the form of gibbsite, contains three molecules of water for each molecule of aluminum oxide. A desirable procedure in this case would be to heat the bauxite to a temperature of 200° to 600° C. in air to expel the three molecules of water and then to react the residual alumina with thionyl chloride to selectively chlorinate the titanium content without significantly chlorinating the alumina, thus producing a product of lower titanium content than would be obtained by direct calcination of the bauxite.

The choice of a suitable temperature will depend upon several factors. The higher the temperature, the greater the reaction velocity but the greater also will be corrosive attack on the materials of construction of the reaction chamber. The temperature should be sufficiently high to allow volatilization of the $TiCl_4$ produced if it is desired to separate this product by volatilization extraction. However, the temperature must be limited, in cases where it is desired not to modify the chemical or physical composition of the mineral, as has already been pointed out in the case of kaolin and bauxite. The boiling point of titanium tetrachloride is 136° C. at 760 mm. pressure so that, if the vapor of thionyl chloride were undiluted, this would be the minimum desirable reaction temperature if the tetrachloride was to be recovered by volatilization. If the thionyl chloride diluted with, for example, nitrogen, the titanium tetrachloride would be separated by volatilization at a temperature lower than 136° C. However, we have found that, in general, the reaction rate at temperatures substantially below 200° C. are too low to be commercially practicable and that at temperatures above about 500° C. the corrosive effects of thionyl chloride become significant. It is preferred therefore to carry out the reaction at a temperature within the range 200° to 450° C.

When the process is carried out as a solid/gas or vapor reaction, it would normally be effected at or near to atmospheric pressure. In some cases it may be preferred to carry out the process as a solid/liquid reaction; thus the reaction could be carried out in a closed vessel at a temperature and pressure such that both the thionyl chloride and the titanium tetrachloride will be mainly in the liquid state. The reaction products could be separated either by liquid/solid separation followed by fractional distillation of the liquid phase to separate $SOCl_2$ and TiCl₄ or by flashing off the SOCl₂ and TiCl₄ as vapors which would be condensed and separated by fractional distillation. At higher reaction temperatures the pressure would also be higher.

In some cases it may be preferred to grind the mineral to reduce its particle size before reacting it with thionyl chloride and thereby to accelerate the reaction. In general minerals such as ilmenite, rutile and leucoxene in their normal commercially available forms are fine sands of which the particles are mainly in the minus 100 plus 200 U.S sieve range. Sometimes such minerals are in massive form and it is then desirable to reduce the size to minus 4 U.S. sieve size and preferably to minus 100 U.S. sieve size. On the other hand, kaolins are usually produced as fine powders of particle size at least 50 percent less than 10 microns and further comminution is not necessary.

The following examples are given for illustrative purposes and are not considered to be limiting the invention to the specific materials and procedures described therein. The examples describe the extraction of titanium as tetrachloride from the minerals, ilmenite, attapulgite and kaolin by reaction between the mineral and thionyl chloride.

EXAMPLE I 3.270 g. of ilmenite was weighed into a porcelain combustion boat which was then introduced into a Vycor combustion tube approximately 1 inch in diameter and 15 inches long. The tube was located in an electrically heated furnace provided with a temperature controller so that the boat containing the ilmenite was located in the hot zone of the furnace. The temperature was raised to 400° C. and maintained at this temperature for seven hours, during which time a stream of nitrogen containing thionyl chloride vapor was continually passed through the tube. This nitrogen/thionyl chloride stream was produced by bubbling pure nitrogen (99.99%) through thionyl chloride contained in a closed flask provided with gas inlet and exit tubes; the exit tube was connected to one end of the Vycor combustion tube. The quantity of thionyl chloride used was determined by weighing the flask before and after the experiment. After the reaction the weight was 1.374 g. and the loss in weight was thus 58.0%. The ilmenite and the reaction product were both analyzed chemically and the results of the analysis were as follows:

|  | $TiO_2$ % by weight of sample | Iron (as $Fe_2O_3$) % by weight of sample |
|---|---|---|
| Ilmenite Before Reaction | 61.79 | 31.63 |
| Reaction Product | 45.62 | 31.33 |

|  | % Volatilized by Reaction With $SOCl_2$ |
|---|---|
| $TiO_2$ | 56.5 |
| $Fe_2O_3$ | 41.7 |

EXAMPLE II

The experiment described in Example I was repeated except that the mineral treated with $N_2/SOCl_2$ was attapulgite instead of ilmenite. The attapulgite initially contained 0.32% $TiO_2$ and the product after reaction for seven hours with $SOCl_2$ at 400° C. was found to contain less than 0.05% $TiO_2$, showing that the $TiO_2$ content of the attapulgite had been substantially volatilized by reaction with $SOCl_2$.

EXAMPLE III

The experiment described in Example I was repeated except that the mineral treated with $N_2/SOCl_2$ was kaolin instead of ilmenite. The kaolin was first dried to remove free moisture; the dried material contained 0.58% $TiO_2$. After treating with $N_2/SOCl_2$ for seven hours at a temperature of 315° C. the residual material was found to contain 0.09% $TiO_2$, showing that 84.5% of the $TiO_2$ originally contained had been removed. It was found that the material after treatment was substantially unaltered kaolin.

EXAMPLE IV

The experiment of Example III was repeated using a calcined kaolin ($Al_2O_3.2SiO_2$) instead of kaolin. The initial $TiO_2$ content was 1.74%. After treatment with $N_2/SOCl_2$ for seven hours at 315° C. the $TiO_2$ content was 0.13% equivalent to 92.5% $TiO_2$ removal. A material balance, if performed on the above-mentioned data of Examples III and IV, would show that the silica and alumina components of the kaolin were substantially unreacted.

EXAMPLE V

In other experiments about 50% of the $TiO_2$ content of ATTAGEL® 50, a commercial attapulgite clay product, was removed at 215° C. by treatment with thionyl chloride. Virtually all of the $TiO_2$ was removed at temperatures in the range of 315° to 450° C.

We claim:

1. A process for extracting titanium from a titaniferous material selected from the group consisting of minerals containing titanium, titaniferous concentrates or tailings arising from beneficiation of minerals containing titanium and titaniferous waste products or by-products of the processing of minerals containing titanium or mixtures thereof, said titaniferous material containing alumina, silica or combinations thereof, which comprises contacting said titaniferous material at a temperature in the range of about 200° to 500° C. with a chlorinating agent consisting essentially of vaporous thionyl chloride to react at least a part of the titanium contained in said titaniferous material to form titanium tetrachloride without substantially consuming silica and alumina components of said titaniferous material, and separating said titanium tetrachloride from the remainder of said titaniferous material.

2. The process of claim 1 wherein the titanium tetrachloride formed in the reaction is separated from said remainder by volatilization.

3. The process of claim 2 wherein the titaniferous material at a temperature in the range of 250° C. to 450° C. is contacted with a gas stream containing thionyl chloride diluted in a gas.

4. The process of claim 3 wherein titanium is the principal constituent of said titaniferous material.

5. The process of claim 4 wherein said titaniferous material is selected from the group consisting of rutile, ilmenite and leucoxene.

6. The process of claim 1 wherein said titaniferous material is dried to remove physically held water before being contacted with thionyl chloride.

7. The process of claim 1 wherein said titaniferous material contains water chemically held therein and said material is heated in air to remove said water before being contacted with thionyl chloride.

8. The process of claim 7 wherein said titaniferous material is ilmenite.

9. The process of claim 1 wherein said titaniferous material is bauxite.

10. The process of claim 1 wherein said temperature is below 350° F.

11. A process for extracting titanium from a titaniferous material selected from the group consisting of minerals containing titanium, titaniferous concentrates or tailings arising from beneficiation of minerals containing titanium and titaniferous waste products or by-products of the processing of minerals containing titanium or mixtures thereof which comprises contacting said titaniferous material with vaporous thionyl chloride and elevated temperature to react at least a part of the titanium contained in said titaniferous material to form titanium tetrachloride, and separating said titanium tetrachloride from the remainder of said titaniferous material by extraction with a solvent.

12. A process for extracting titanium from a hydrated clay containing a colored titanium oxide as a minor impurity which comprises reacting said clay with vaporous thionyl chloride at elevated temperature to convert at least a part of the titanium contained in said hydrated clay to titanium tetrachloride, the temperature of reaction being insufficient to permanently dehydrate said clay, and separating said titanium tetrachloride from the remainder of said hydrated clay.

13. The process of claim 11 or 12 wherein the reaction is carried out at a temperature in the range of about 200° to 500° C.

14. The process of claim 2 wherein the reaction is carried out at a pressure above atmospheric pressure.

15. The process of claim 12 wherein said hydrated clay comprises kaolin.

16. The process of claim 12 wherein said hydrated clay comprises attapulgite.

* * * * *